Oct. 9, 1928.
R. RICHTER ET AL
1,687,311
COMPENSATED ALTERNATE CURRENT MACHINE
Filed April 1, 1925
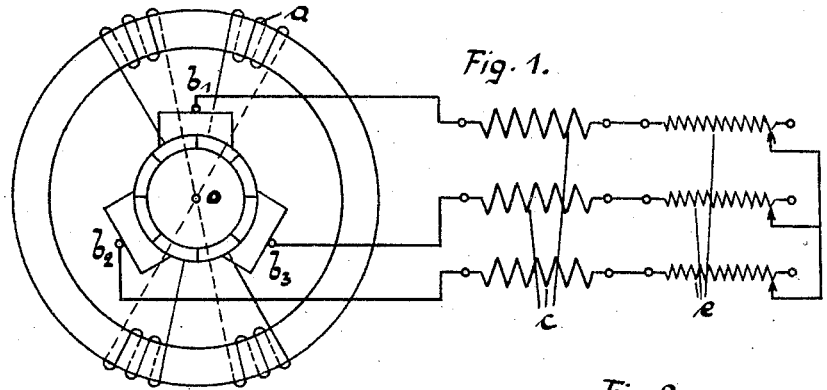
Fig. 1.
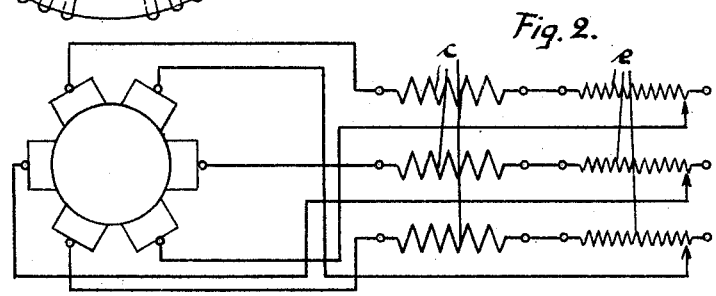
Fig. 2.
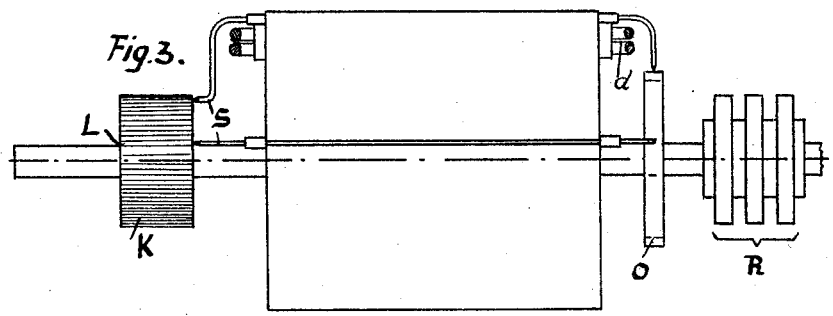
Fig. 3.
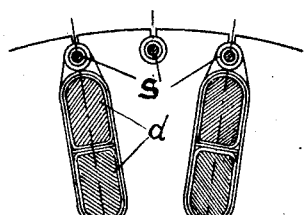
Fig. 5.
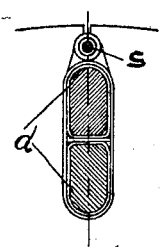
Fig. 4.
Inventors:
Rudolf Richter.
Willy Sarfert.
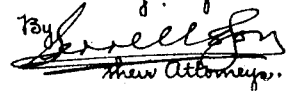
their Attorneys.

Patented Oct. 9, 1928.

1,687,311

UNITED STATES PATENT OFFICE.

RUDOLF RICHTER, OF DURLACH, AND WILLY SARFERT, OF DRESDEN, GERMANY, ASSIGNORS TO THE FIRM OF SACHSENWERK, LICHT- UND KRAFT-AKTIENGESELLSCHAFT, OF NIEDERSEDLITZ, NEAR DRESDEN, GERMANY.

COMPENSATED ALTERNATE-CURRENT MACHINE.

Application filed April 1, 1925, Serial No. 20,007, and in Germany April 4, 1924.

Heretofore, alternate current machines and more particularly single phase or multiphase shunt wound motors have been provided with a commutator winding for the purpose of the compensation of the phase of the motor. These alternate current machines are made in various types. For example, in one type there is a commutator winding arranged in the secondary part of the machine and supplied by an exciter winding not provided with a commutator and arranged in the primary part or by the secondary winding of a transformer connected to the net. In machines of another type, the commutator winding is placed in the primary part and is employed to supply the exciting current. In apparatus of the first type the relative speed between the rotating field and the commutator winding is small and consequently the commutation is not accompanied with any material difficulties. In apparatus of the second type, however, in which there is a relatively large difference in speed between the rotating field and the commutator winding the situation is entirely different.

The present invention relates to alternate current motors of the second type to which reference has been made. With commutator windings of motors of this type, difficulties have been experienced due to the fact that the active flux cannot be determined at will in a manner most suitable for the design of the commutator winding because the said flux is dependent upon other considerations. For example, in machines for high capacities this flux is sometimes far greater than is desirable for the appropriate commutator winding. In such cases it is difficult to keep the commutator voltage, that is the voltage between two commutator brushes sufficiently low to be used for the excitation of the machine, and also to keep the segment voltage, that is the voltage between two adjacent commutator segments sufficiently low to run the motor without sparking.

The object of the present invention is to overcome these difficulties and is attained by the use of an open coil winding in which the coils may consist of ring turns or drum turns, as will be hereinafter more particularly described.

In the drawing Figure 1 is a diagrammatic plan illustrating an example of an open coil winding for a two-pole machine the coils consisting of ring turns.

Fig. 2 is a similar view illustrating a modified arrangement of brushes and their connections.

Fig. 3 is a diagrammatic illustration of the armature and its connections showing the use of single bar conductors instead of coils, and Figures 4 and 5 are transverse sections illustrating the armature windings of the type shown in Fig. 3.

Referring to the drawings Fig. 1 represents the diagram of a two pole machine arranged with an open winding. The winding $a$ as shown in this figure consists of ring turns, but as will be understood this may be arranged otherwise, for example as drum turns instead of ring turns. The point $O$ represents the inter-connecting point of the coils $a$. Three brushes $b_1$, $b_2$, $b_3$, spaced at 120 electric degrees, slide on the commutator and are connected with the secondary winding $c$. The other side of the secondary winding $c$ is connected with the starter $e$. The value of the electromotive force at the commutator brushes can be increased at will by increasing the number of turns of the coils. In a drum winding a further variation is possible by shortening the pitch for obtaining a diminution of the commutator voltage.

For a better utilization of the armature, wider brushes can be provided covering a greater number of segments whereby the length of the commutator and consequently the overall length of the machine can be kept smaller. Also for the same purpose the number of the brushes can be made a multiple of the number of phases of the machine as shown in Fig. 2.

The possibility of reducing the voltage between two adjacent segments to almost negligible values is explained by the following statement: The vectors of the voltages produced in the coils of the winding coincide with the radii drawn from the axis of the armature to the segments of the commutator and they lie in a plane perpendicular to the axis. The vector of the segment voltage is the difference of the vectors of two adjacent coils or armature phases. If the number of armature-phases is increased the segment voltage decreases. In a similar way the vector of the brush-to-brush or commutator voltage is found as the vector difference of the voltages of those coils whose segments are in contact with the brushes.

The number of armature-phases can be made a maximum in an arrangement that may be called "open-cage" winding. This improvement consists in the feature, that each phase of the commutator winding consists of a single bar, which is connected at one side of the rotor iron to a short circuit ring and at the other side to a commutator segment.

In Fig. 3 showing a constructional example, at R are indicated the slip rings by which the distribution current is supplied to the primary winding $d$ arranged on the rotor. The commutator is indicated at K. The commutator winding consists of bars or wires S, which are connected at one end with a commutator segment L and at the other end with the short circuiting ring O'. The winding can be arranged in such a manner that there is a bar of the above mentioned kind in each slot so that the number of the slots and the number of the commutator bars are the same.

For this construction the cross-section of each of the rotor slots may be as shown in Fig. 4. S represents as before the bar of the commutator winding, which is arranged above two other conductors $d$ in the slot. These conductors $d$ are the main inducing winding of the primary member. In the arrangement shown the bar S does not rest on the bottom of the slot but is arranged in the uppermost part of said slot at the highest possible level, for which purpose the bar S may conveniently be formed and arranged so as to act as a slot-closing wedge. The reactance voltage, which is important for the commutation, is reduced to a minimum by this arrangement of the bar in the uppermost part of the slot.

The commutator winding can also be so formed that the number of segments of the commutator bars is double, or a multiple of, the number of the slots of the rotor. A construction of this kind is represented in Fig. 5 in which one half of the conductors are shown arranged in the uppermost parts of the slots as in Fig. 4 and the other half in the uppermost parts of the intervening teeth.

Further it is possible in the case the number of the commutator bars being equal or less than the number of the slots of the rotor that the commutator conductors are only arranged in the uppermost parts of the teeth.

By increasing the number of the commutator bars the voltage existing between two adjacent segments, which is important for the sparkless running of the machine, is reduced. If necessary the winding can be provided in a known manner with equalizing connections.

The very simple arrangement of the commutator winding insures the desired security of working and renders feasible a considerable reduction of the segment voltage. Repairs of the commutator winding when necessary, are easily carried out owing to the fact that all parts are accessible and each bar can readily be replaced.

The increase of the safety of operation of compensated machines is of particular importance when high capacities have to be dealt with. While, up to the present, many reasons militated against the provision of machines for several hundred or thousand kilowatts with compensating windings, the present invention enables such machines to be constructed with practical safety of operation in the simplest manner. The described construction of the compensating winding is especially suitable for machines designed for high capacity for the reason that the voltage induced in a single bar is sufficiently great to supply an adequate compensation voltage at the commutator.

We claim as our invention:

1. In an alternating current machine, a primary member including a commutator, and an auxiliary compensating winding connected to the commutator and arranged as an open coil winding.

2. In an alternating current machine, a primary member including a commutator, a plurality of brushes bearing on the commutator, and an auxiliary compensating winding connected to the commutator and arranged as an open coil winding, the number of the said brushes being a multiple of the number of the phases of the main windings of the machine.

3. In an alternating current machine, a primary member including a commutator, and an auxiliary compensating winding connected to the commutator and arranged as an open coil winding with the coils thereof each consisting of one or more drum turns.

4. In an alternating current machine, a commutator, an armature drum, a short circuit ring and a compensating winding constructed as an open winding, each winding element consisting of a single bar connected at one end to a commutator element and the other end to the said short circuit ring.

5. In an alternating current machine, a commutator, an armature drum having a plurality of slots for a primary winding, a short circuit ring and a compensating winding constructed as an open winding, each winding element consisting of a single bar connected at one end to a commutator element and the other end to the said short circuit ring, the commutator bars being arranged in the outermost parts of the slots for the primary winding.

6. In an alternating current machine, a commutator, an armature drum having a plurality of slots for a primary winding, a short circuit ring, a compensating winding constructed as an open winding each winding element consisting of a single bar connected at one end to a commutator element and the other end to the said short circuit ring, the bars of the compensating winding being arranged in the outermost parts of the slots and of the intervening teeth.

7. In an alternating current machine a commutator, an armature drum having a plurality of slots for a primary winding, a short circuit ring, a compensating winding constructed as an open winding each compensating winding element consisting of a single bar connected at one end to a commutator element and the other end to the said short circuit ring, the said bars being arranged in the outermost parts of the slots and of the intervening teeth and being a multiple of the number of the slots for the primary winding in the armature drum.

8. In an alternating current machine, a commutator, an armature drum having a plurality of slots for a primary winding, a short circuit ring, a compensating winding constructed as an open winding each compensating winding element consisting of a single bar connected at one end to a commutator element and the other end to the said short circuit ring, the said bars being arranged in the outermost parts of the slots and of the intervening teeth and being double the number of the slots for the primary winding in the armature drum.

9. In an alternating current machine, a commutator, an armature drum having a plurality of slots for a primary winding, a short circuit ring, and a compensating winding constructed as an open winding, each compensating winding element consisting of a single bar connected at one end to a commutator element and the other end to the said short circuit ring, the said bars being arranged in the outermost parts of the slots for the primary winding and being constructed as wedges for sealing these slots.

In testimony that we claim the foregoing as our invention, we have signed our names this 14th day of March, 1925.

RUDOLF RICHTER.
WILLY SARFERT.